Aug. 28, 1962 C. V. KRICHTON 3,051,820
ROOM HEATER
Filed June 16, 1958 3 Sheets-Sheet 1
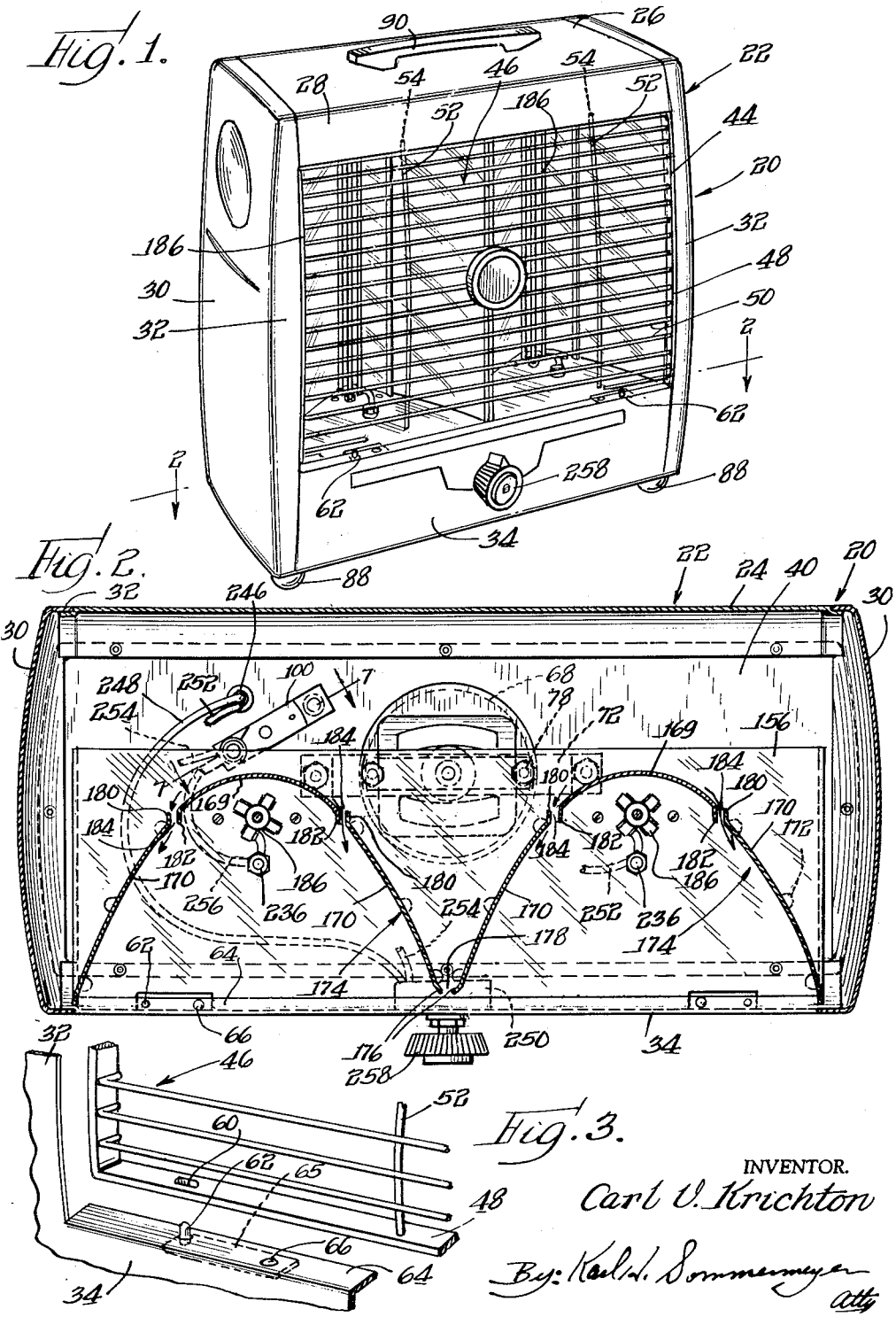
INVENTOR.
Carl V. Krichton
By: Karl L. Sommermeyer
Atty Aug. 28, 1962 C. V. KRICHTON 3,051,820
ROOM HEATER
Filed June 16, 1958 3 Sheets-Sheet 2
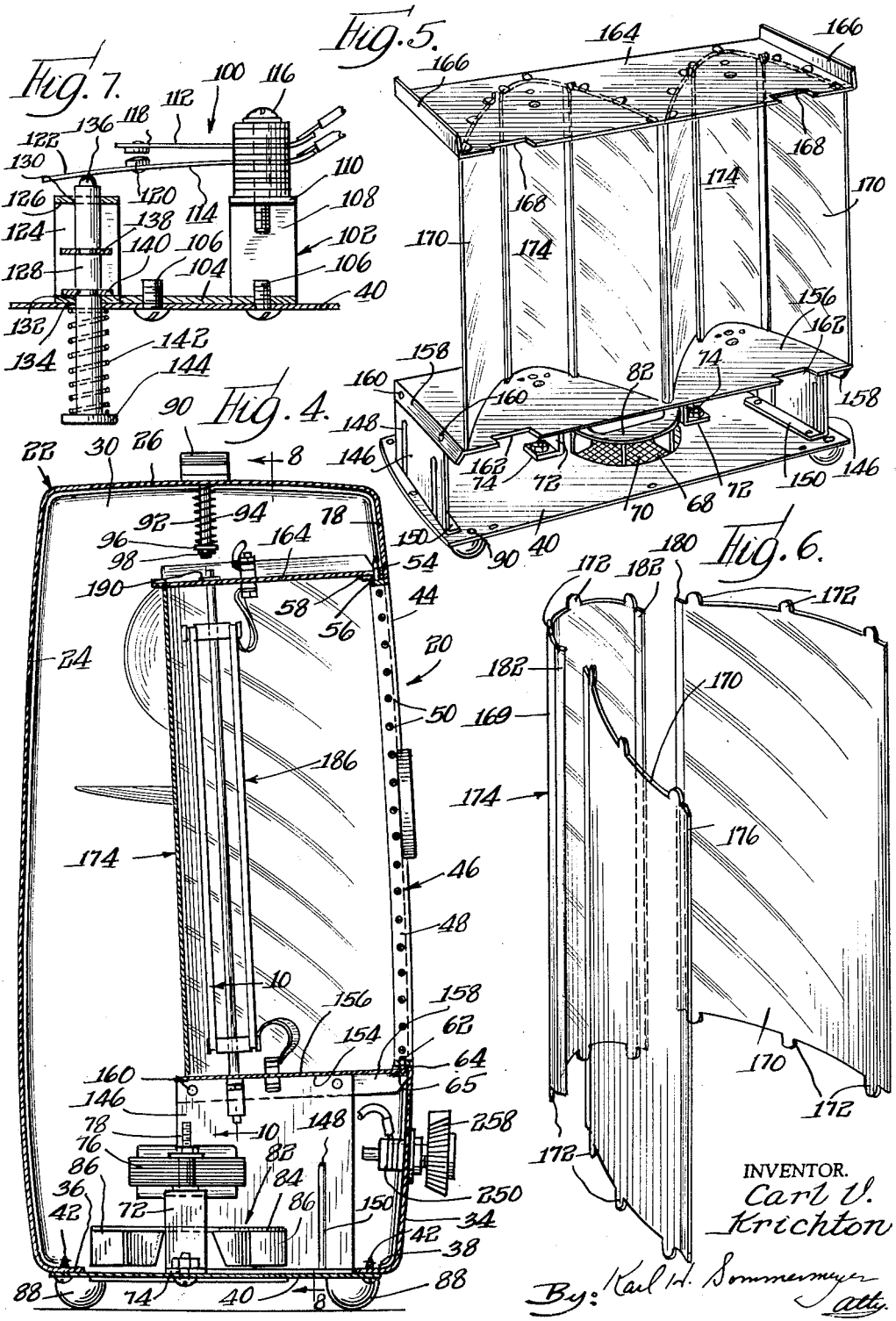
INVENTOR.
Carl V. Krichton
By: Karl H. Sommermeyer
atty.

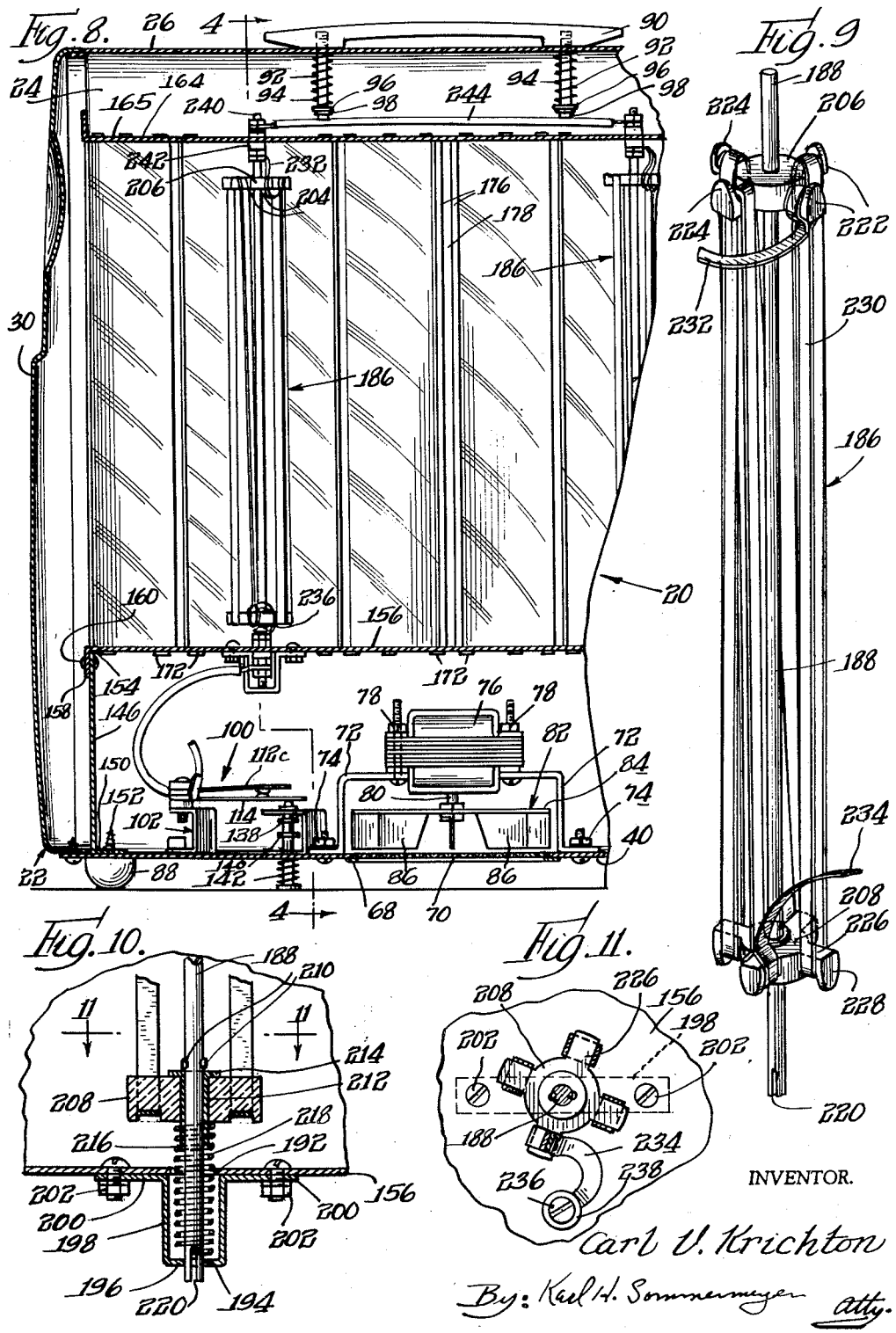

United States Patent Office 3,051,820
Patented Aug. 28, 1962

3,051,820
ROOM HEATER
Carl V. Krichton, Coral Gables, Fla., assignor to Mc-
Graw-Edison Company, Elgin, Ill., a corporation of
Delaware
Filed June 16, 1958, Ser. No. 742,314
2 Claims. (Cl. 219—39)

This invention is concerned generally with the art of household electric appliances, more particularly with an electric heater.

Domestic electric heaters are usually of rather small size, and are readily portable. Such heaters utilize electric resistance elements as a source of heat. In some such heaters, the heating element is mounted in a parabolic or other reflector, and is operated at a sufficiently high temperature to radiate energy. The radiant energy is absorbed by the body of the user, and also by other objects in the room, which thereby become warm and heat the air. In other domestic electric heaters, air is blown over the heating elements by a fan or the like. In such heaters the heating elements remain at a relatively low temperature, and the air moving past the heating elements is heated directly, whereby to warm the room. Some domestic heaters partake of the characteristics of both radiant heaters and fan-forced heaters. This invention is concerned with a heater of this combination type.

Electric heaters inherently have very high efficiency, since conversion of electric energy into heat energy in the resistance heating elements is very nearly 100 percent efficient. However, for the utmost efficiency, as much as possible of the heat so developed should be radiated or blown into the air. Heat that is absorbed in the heater itself is not directly utilized.

In the case of fan-forced heaters, it is desirable that the air should move as uniformly as possible past the heating elements. This avoids the formation of hot spots which tend to shorten the life of the heating elements. Furthermore, for efficient heat transfer from the heating element to the air, it is desirable that the air not blow on the heating element to such an extent as to cool the heating element unduly.

Accordingly, it is an object of this invention to provide an electric heater of new and improved construction, which heater utilizes electric energy in an even more efficient manner than prior electric heaters.

More particularly, it is an object of this invention to provide an electric heater operating on a combination of radiant energy and moving air principles, wherein the moving air maintains the heater at a low temperature, thereby promoting efficiency and eliminating the dangers and discomforts to the user of high heater temperatures.

It is another object of this invention to provide a portable electric heater of simple and rugged construction.

Other and further objects and advantages of the present invention will be apparent from the following description when taken in connection with the accompanying drawings; wherein:

FIG. 1 is a perspective view of an electric heater constructed in accordance with the principles of this invention;

FIG. 2 is a horizontal sectional view through the heater as taken along the line 2—2 in FIG. 1;

FIG. 3 is a detail perspective view showing the mounting of the lower portion of the protective grill;

FIG. 4 is a vertical sectional view through the heater as taken substantially along the line 4—4 in FIG. 8;

FIG. 5 is a fragmentary perspective view showing the reflectors and the associated parts;

FIG. 6 is an exploded perspective view of one of the reflectors;

FIG. 7 is an enlarged detail view in vertical section as taken along the line 7—7 in FIG. 2;

FIG. 8 is a fragmentary vertical sectional view taken along the line 8—8 in FIG. 4;

FIG. 9 is a perspective view on an enlarged scale of one of the heating elements;

FIG. 10 is a detail vertical sectional view taken along the line 10—10 in FIG. 4 showing the mounting of one of the heating elements; and FIG. 11 is a horizontal sectional view as taken along the line 11—11 in FIG. 10.

Referring now in greater particularity to the drawings, and first to FIGS. 1, 2, 4 and 8, there will be seen an electric heater designated generally by the numeral 20 and comprising a case or housing 22. The housing is made of sheet metal, and includes a back panel 24 having a top 26 formed integral therewith. The top 26 is provided at its forward edge with an integral depending flange 28. The housing further includes a pair of end panels 30 with inwardly directed peripheral flanges 32 thereon. The peripheral flanges fit over the corresponding portions of the back and top, as well as the depending flange 28, these parts being suitably offset so as to form a smooth or continuous outer surface with the flanges 32. The flanges 32 of the end panels are welded to the back, the top, and the depending flange, and also are welded to a shallow front panel 34. The back panel 24 is provided along its bottom edge with an inturned flange 36, and the front wall or panel 34, similarly is provided with a confronting inturned flange 38. A floor or bottom 40 is secured to these flanges, and to the lower portions of the peripheral flanges 32 of the end panels by detachable fastening means such as sheet metal screws 42.

The depending flange 28, the front wall or panel 34, and the front portions of the inturned flanges 32 of the end panels define a front opening 44 in the housing. This opening is provided with a protective grill 46 (FIGS. 1, 3 and 4) having a peripheral frame 48 of strap-like material, with a plurality of vertically spaced horizontal wires 50 secured thereto, and braced by a pair of horizontally spaced vertical wires or rods 52. The upper ends of the vertical wires 52 extends above the frame 48 as at 54, and are received in complementary holes 56 in an inturned, substantially horizontal flange 58 on the lower edge of the depending flange 28. The bottom or lower horizontal member of the frame 48 is provided adjacent the opposite ends or corners thereof with holes or apertures 60, and pins 62 extending up through a horizontal flange 64 on the front wall or panel 34 are adapted to be received in these holes. The pins are mounted on the free ends of spring strips 65 having their opposite ends secured as by rivets 66 to the under surfaces of the flange 64. The pins 62 readily can be depressed to a level with or below the top surface of the flange 64 to allow the protective grill 46 to be inserted or removed.

The back, top (including the depending front flange), the end panels, and the front wall constitute a housing that is substantially sealed, except for the front opening 44 and the bottom. The detachable floor 40 substantially seals the bottom, but is provided with a central circular aperture 68 (see FIGS. 5 and 8) having a protective grill cloth or wire mesh 70 mounted therein and spot welded in place at the edges. A pair of substantially Z-shaped brackets 72 is secured on diametrically opposite sides of the aperture 64 by means of nuts and bolts 74. The brackets 72 support a small electric motor 76, preferably of the shaded pole type, by means of nuts and bolts 78. The motor shaft 80 extends vertically downward, and has fixed thereto a centrifugal impeller 82 comprising a horizontal circular plate 84 and a plurality of radially disposed vertical blades 86 depending therefrom and spaced out from the center thereof. As will be apparent, rotation of the impeller 82 by the motor 76 tends to pull air in through the mesh 70, and to expel it through the front opening 44.

It will be observed that the floor 40 is provided with rubber feet 88 secured in place as by rivets 89. Correspondingly, and before continuing with the remaining parts mounted on the floor, it will be observed that a handle 90 (FIGS. 1, 4 and 8) is mounted on the top panel 96 of the housing for carrying the electric heater 20. The handle 90 preferably is molded of plastic and is provided with a pair of depending studs 92 extending through suitable apertures in the top panel 26. Helical springs 94 surround the studs 92 and are compressed between the top panel 26 and washers 96 held adjacent the bottom ends of the studs by C-washers 98 received in annular grooves in the studs. The springs 94 normally hold the handle 90 down against the top surface of the top panel 26, but allow the handle to be raised for carrying the heater.

Returning now to the floor 40, particularly in FIGS. 2, 7 and 8, there will be seen a safety switch mechanism 100 associated therewith. The safety switch includes a bracket 102 having a mounting flange 104 secured against the floor 40 by means such as self tapping screws 106 extending through the floor 40 and threaded into the flange 104. An upstanding web 108 adjacent one end of the flange 104 supports a horizontal flange 110 spaced above the flange 104. A pair of switch arms 112 and 114 is mounted in insulated relation on the flange 110 by a screw 116 and suitable insulators and spacers. The switch arm 112 is a normally fixed switch arm, having a fixed switch contact 118 thereon. The switch arm 114 is a movable switch arm, having a movable switch contact 120 engageable with the switch contact 118. The switch arm 114 is provided with an extension 122 beyond the contact 120.

A second upstanding leg 124 adjacent the opposite end of the flange 104 from the leg 108 supports a horizontal guide flange 126. A plunger 128 is vertically movable through aligned holes 130, 132, and 134 in the flange 126, the flange 104, and the floor 40, respectively. The upper end of the plunger is provided with an insulating button 136 engaging the extending end 122 of the movable switch arm. A C-washer 138 is mounted in a suitable groove in the plunger 128 relatively adjacent the upper end thereof, and a second C-washer 140 is similarly mounted at a location spaced below the C-washer 138. The C-washer 138 is engageable with the guide flange 126 to limit upward movement of the plunger under extreme conditions, while the C-washer 140 engages the mounting flange 104 to limit downward movement of the plunger. A helical spring 142 encircles the plunger below the floor 40, and is compressed between the floor and a more or less flat head 144 on the bottom end of the plunger. When the feet 88 of the heater rest on a substantially flat floor or other supporting surface, as in FIG. 8, the flat head 144 of the plunger 122 engages the floor, and holds the plunger in raised position. The insulating projection or button 136 at the top of the plunger flexes the movable switch arm 114 up into substantially horizontal position, thereby forcing the movable contact 120 up against the fixed contact 118, the fixed switch arm 112 flexing slightly above the horizontal. However, if the heater is tipped over or lifted, the spring 142 forces the plunger down, as in FIG. 7, and the resiliency of the movable switch arm separates the contacts.

A pair of sheet metal brackets 146 is secured adjacent the opposite ends of the floor 40. The flanges are provided with substantially vertical stiffening ribs 148. Right angularly disposed flanges 150 are provided along the lower edges of the brackets 146 and are secured to the floor 40 by means such as sheet metal screws 152. The upper edges 154 of the brackets 146 are inclined, the front corners thereof being slightly higher than the rear corners.

A reflector base plate 156 extends across the brackets 146, terminating at the rear substantially at the rear edges of the brackets, and projecting forwardly therefrom. The reflector base plate 156 is provided with downturned flanges 158 along its opposite side edges, and these flanges are secured to the brackets 146 by means such as rivets 160. The forwardly extending front edge of the reflector base plate 156 lies along the bottom surface of the rearwardly directed flange 64 of the front wall 34, and is provided with suitable recesses or cutouts 162 to provide clearance for the pins 62 and the associated spring strips 65. The reflector base plate 156 is of sheet metal having a polished, reflective upper surface. Aluminum has been found quite satisfactory for this purpose.

A reflector top plate 164 is spaced above the base plate 156 a substantial distance, and is parallel thereto. The top plate 164 is substantially a mirror image of the base plate 156, having upstanding edge flanges 166, and front recesses or cutouts 168 similar to the flanges 158 and recesses 162. It will be appreciated that the cutouts 168 are larger than necessary to accommodate the upwardly projecting ends 54 of the vertical members 52 of the grill, but that it is more economical to fabricate the upper plate in the same dies as the base plate than to provide simply clearance space for the upward projections 54. The reflector top plate 164 is supported from the base plate 156 by a plurality of reflector elements comprising a pair of back elements 169 and a pair of side elements 170. All of the reflector elements 169 and 170 comprise cylindrical segments. Specifically, the segments are of right circular cylinders. However, the radii of the side reflector elements 170 are substantially five times the radii of the back reflector elements 169. The reflector elements are secured to the base plate 156 and top plate 164 by ears 172 along the top and bottom edges, projecting through suitable slots in the base and top plates and bent over at right angles. The elements are mounted in juxtaposition so as to provide a pair of substantially parabolic reflectors 174. The adjacent edges 176 of the inner side reflector elements 170 are deflected toward one another so as to leave only a narrow slot 178 between them. The rear edges of the side reflector elements 170 all are rearwardly deflected as at 180, and the front edges of the back elements similarly are forwardly deflected at 182, thereby providing narrow slots 184 extending from top to bottom of the reflectors 174. As will be appreciated, the reflector elements 169 and 170 are polished on the inner or reflective surfaces thereof, and conveniently comprise sheet aluminum, the same as the top plate 164 and the base plate 156. As will be seen in FIG. 4, the inclination of the top edges 154 of the brackets 146 causes the reflectors 174 to be tilted slightly backwards, whereby to conform to the slightly inclined front face of the heater, and to aim heat up into a room from floor level.

Each reflector 174 is provided with a resistance heating unit 186 substantially on the focal axis thereof. The two heating units 186 are of identical construction, and the construction thereof will be seen with particular reference to FIGS. 8–11. Each heating element includes a central rod 188 extending through an aperture in the top plate 164 and secured as by a press-on type of spring washer 190 (see FIG. 4). The rod 188 also extends through an aperture 192 (see particularly FIG. 10) in the base plate 156, this aperture being substantially larger in diameter than the rod 188, and through an aperture 194 in the base or bight 196 of a U-shaped bracket 198 having lateral ears 200 underlying the base plate 156 and secured thereto by nuts and bolts 202. Each rod 188 is provided with a pair of ears 204 (FIG. 8) swaged radially outwardly relatively toward the top plate 164. The ears support a ceramic insulator 206 on each rod. A generally similar ceramic insulator 208 is mounted on the rod relatively toward the bottom thereof, the upward movement thereof being limited by a pair of radially swaged ears 210 (FIG. 10). A metal bushing 212 having a radially extending flange 214 at the upper end thereof extends through the insulator 208 and has a threaded lower end 216. A helical spring 218 is threaded on the end 216 of the bushing 212, the spring encircling the lower end of the rod 188 and extending through the aperture 192. The lower end of the spring is received in a slot 220 extending axially into the bottom of the rod.

The upper ceramic insulator 206 is provided with four radially extending lugs or ears 222 having upwardly directed flanges 224 on the outer ends thereof. The lower ceramic insulator 208 is of similar, but inverted construction, having radially extending ears or lugs 226 with downwardly directed terminating flanges 228. A ribbon-like electric resistance heater element 230 is zigzagged or looped back and forth over the ears 226. The spring 218 resiliently urges the lower insulator down, and hence holds this ribbon-like heating element under tension. Each such heating element is provided with an upper lead 232 and a lower lead 234. The lower leads are connected to screw terminals 236 extending through the base plate 156 and suitably insulated therefrom as by ceramic insulators 238. Similarly, the upper leads 232 are secured to screw terminals 240 extending through the top plate 164, and insulated therefrom by suitable ceramic insulators 242. The upper screw terminals 240 are interconnected by a wire 244 having suitable heat resisting insulation, such as of asbestos material thereon.

The heater 20 is provided with the usual flexible line cord entering the heater through a rubber grommet 246 (FIG. 2) in the floor 40. One of the wires 248 of the drop cord or lead wire extends directly to a thermostat mechanism 250, which may be of conventional construction. The other of the wires, as indicated at 252, leads directly to the screw terminal 236 of the right hand reflector 174 (as viewed in the drawings). A wire 254 leads from the thermostat to the safety switch 100, and a wire 256 leads from the safety switch to the left hand screw terminal 236. The two heating elements thus are connected in series. The wires for the motor 76 may lead to the two screw terminals 236, or otherwise may be connected to the wires 252 and 256 whereby the motor is energized in parallel with the heating elements at the full line potential.

It will now be apparent that when the drop cord is plugged in to a suitable electric receptacle, and the thermostat 250 is closed, as determined by the temperature of the heater, and by the setting of the thermostat as effected by the knob 258, the heating elements 186 will be energized. Since the assembled reflector elements simulate a pair of parabolas, radiant energy is reflected out into the room. As will be appreciated, the parabolas could be simulated by other concave surfaces, or could actually be comprised of parabolic segments. The centrifugal impeller or fan 86 causes pressure to build up within the housing. Since the housing is substantially sealed, the air passes out through the slots 184 between the reflector elements, as indicated by the arrows in FIG. 2. The air thus is directed over the concave surfaces of the side reflector elements 170, and is warmed thereby. Thus, no substantial amount of heat is dissipated in the side reflector elements. It will be appreciated that air passes along the outside of the other reflector elements, and to some extent along the outsides of the inner side elements and out through the slot 178, whereby all of the reflector elements are cooled by the moving air. Accordingly, substantially no heat is dissipated in the heater itself, while the occupants of the room are warmed both by the fan-forced heated air, and by radiant energy.

The construction of the reflectors as shown and described greatly facilitates fabrication thereof, and furthermore prevents air from blowing directly on the heating elements. Such blowing tends to cause localized cooling, with converse hotspots, which tends to lead to relatively short service life.

It will be understood that the specific example of the invention as herein shown and described is for exemplary purposes only. Various changes in structure will no doubt occur to those skilled in the art, and will be understood as forming a part of the invention insofar as they fall within the spirit and scope of the appended claims.

The invention is claimed as follows:

1. A heater comprising a substantially closed casing having an air inlet and an open front, air impeller means in said casing for pulling air in through said inlet and tending to expel said air from said open front, substantially parabolic heat reflector means mounted behind said open front, said reflector including a three-piece reflector having a back piece and two side pieces, said side pieces being spaced from said back piece to provide openings in said reflector, and heating element means mounted in said parabolic reflector substantially on the focal axis thereof, all of said openings in said reflector being disposed laterally and opening forwardly of said heating element means for guiding air from the convex side to the concave side of said reflector means without impinging directly on said heating element means.

2. A heater comprising a substantially sealed housing having an air inlet and an open front, an air impeller in said housing for pulling air in through said inlet and tending to expel air from said open front, curved heat reflector means mounted behind and substantially closing said open front, said reflector means comprising a pair of similar substantially parabolic reflectors, said parabolic reflectors being spaced apart to provide a slot for egress of air, each of said parabolic reflectors comprising three pieces including a back piece and a pair of side pieces all of concave-convex construction and oriented with the concave sides toward the open front of said heater and together approximating a parabolic reflector, said side pieces being spaced from respective ones of said back pieces for providing air outlet means from said housing through said reflector, and heating element means mounted in said reflector substantially on the focal axis thereof.

References Cited in the file of this patent

UNITED STATES PATENTS

| | | |
|---|---|---|
| 1,705,812 | Fisher | Mar. 19, 1929 |
| 1,908,559 | Roser | May 9, 1933 |
| 1,942,758 | Jessup | Jan. 9, 1934 |
| 2,188,122 | Steingruber | Jan. 23, 1940 |
| 2,410,211 | Gough | Oct. 29, 1946 |
| 2,433,137 | Marr | Dec. 23, 1947 |
| 2,438,861 | Neiser | Mar. 30, 1948 |
| 2,445,250 | Steingruber | July 30, 1948 |
| 2,456,781 | Hardey | Dec. 21, 1948 |
| 2,469,234 | Lindberg et al. | May 3, 1949 |
| 2,476,492 | Hersh | July 19, 1949 |
| 2,590,600 | Farr et al. | Mar. 25, 1952 |
| 2,707,745 | Farr et al. | May 3, 1955 |

FOREIGN PATENTS

| | | |
|---|---|---|
| 745,700 | Great Britain | Feb. 29, 1956 |